W. H. MORAN.
MACHINE ATTACHMENT.
APPLICATION FILED MAY 28, 1919.
1,341,066.
Patented May 25, 1920.
7 SHEETS—SHEET 3.
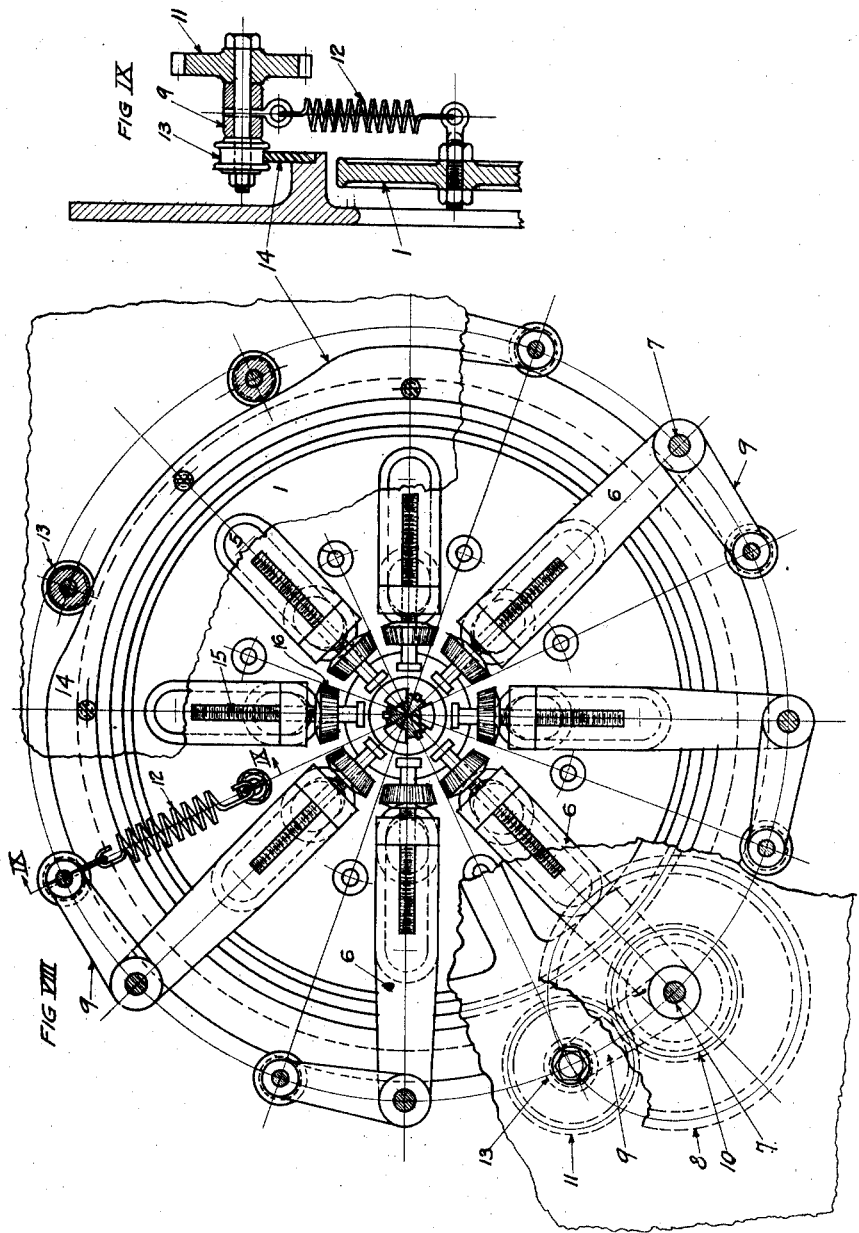
WITNESSES:
INVENTOR.
William H. Moran
BY Christy and Christy
his ATTORNEYS W. H. MORAN.
MACHINE ATTACHMENT.
APPLICATION FILED MAY 28, 1919.
1,341,066.
Patented May 25, 1920.
7 SHEETS—SHEET 4.
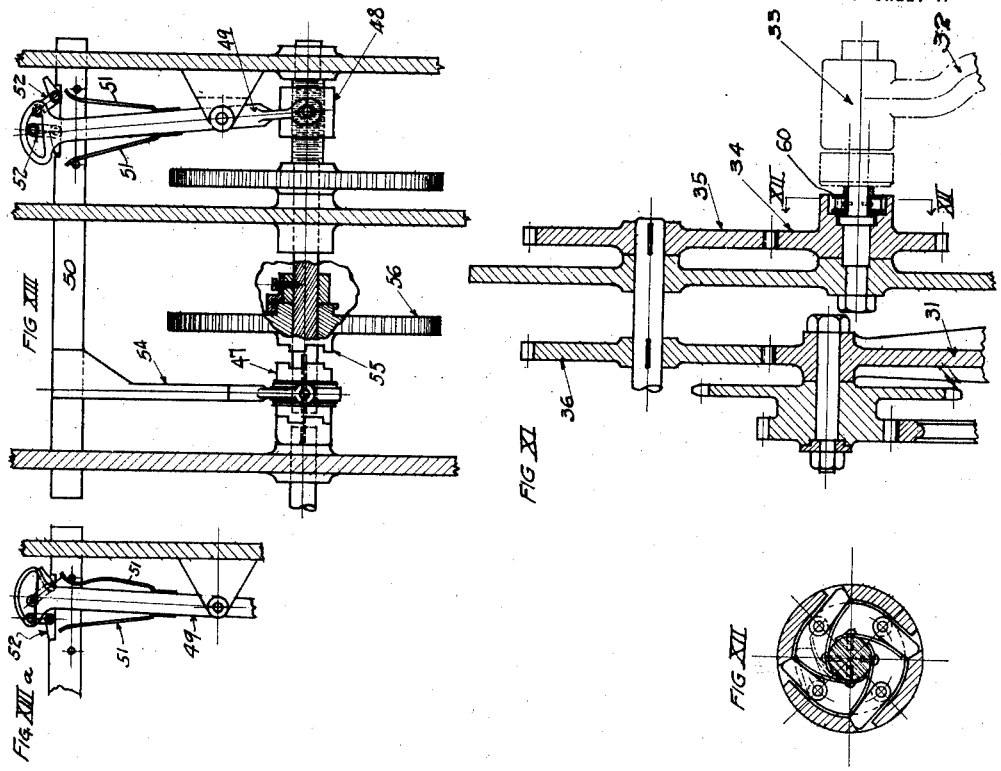
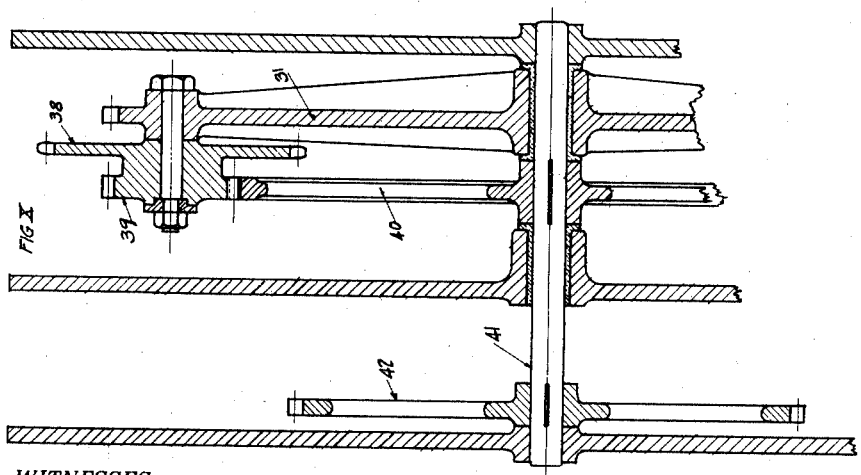

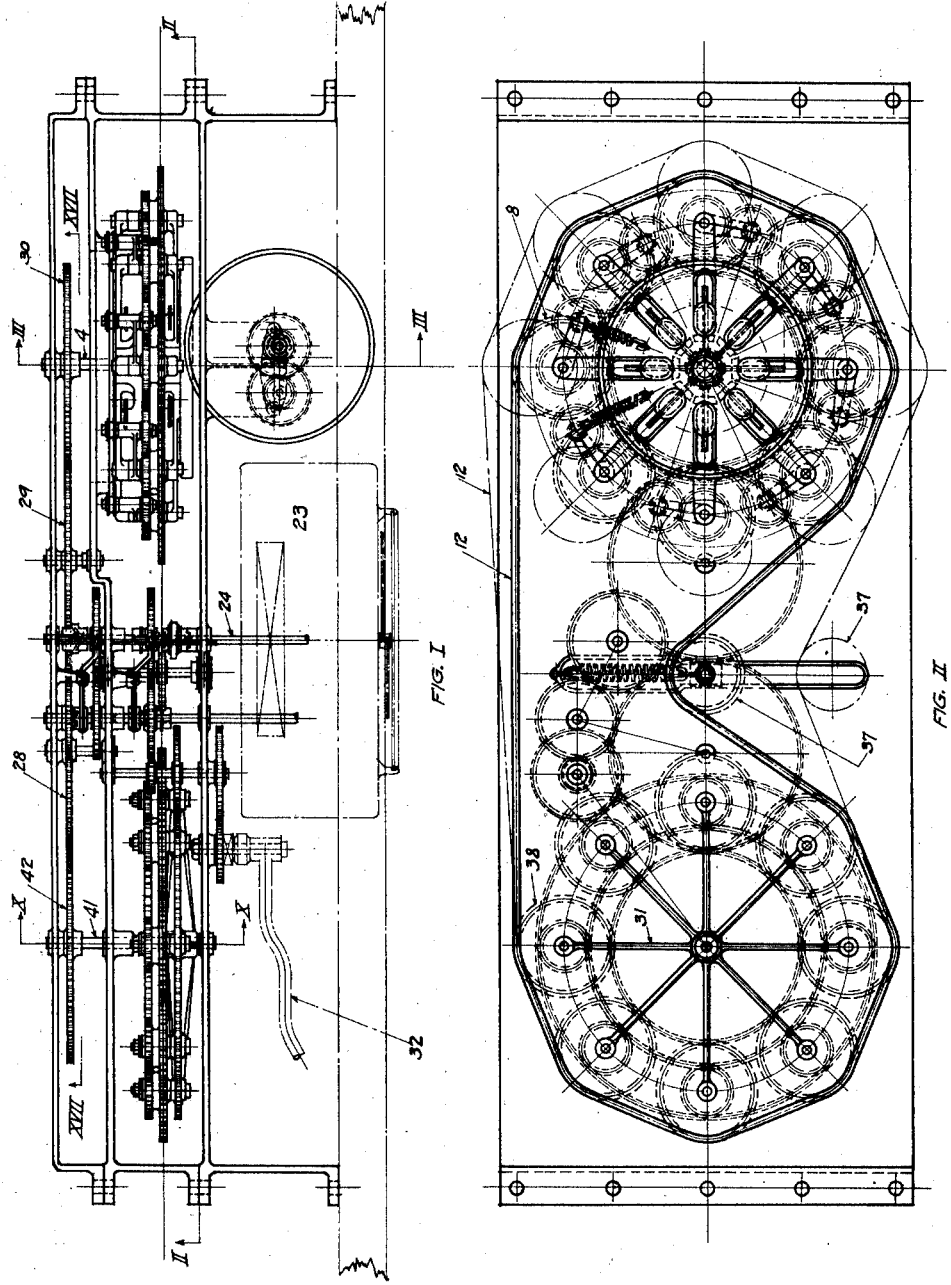

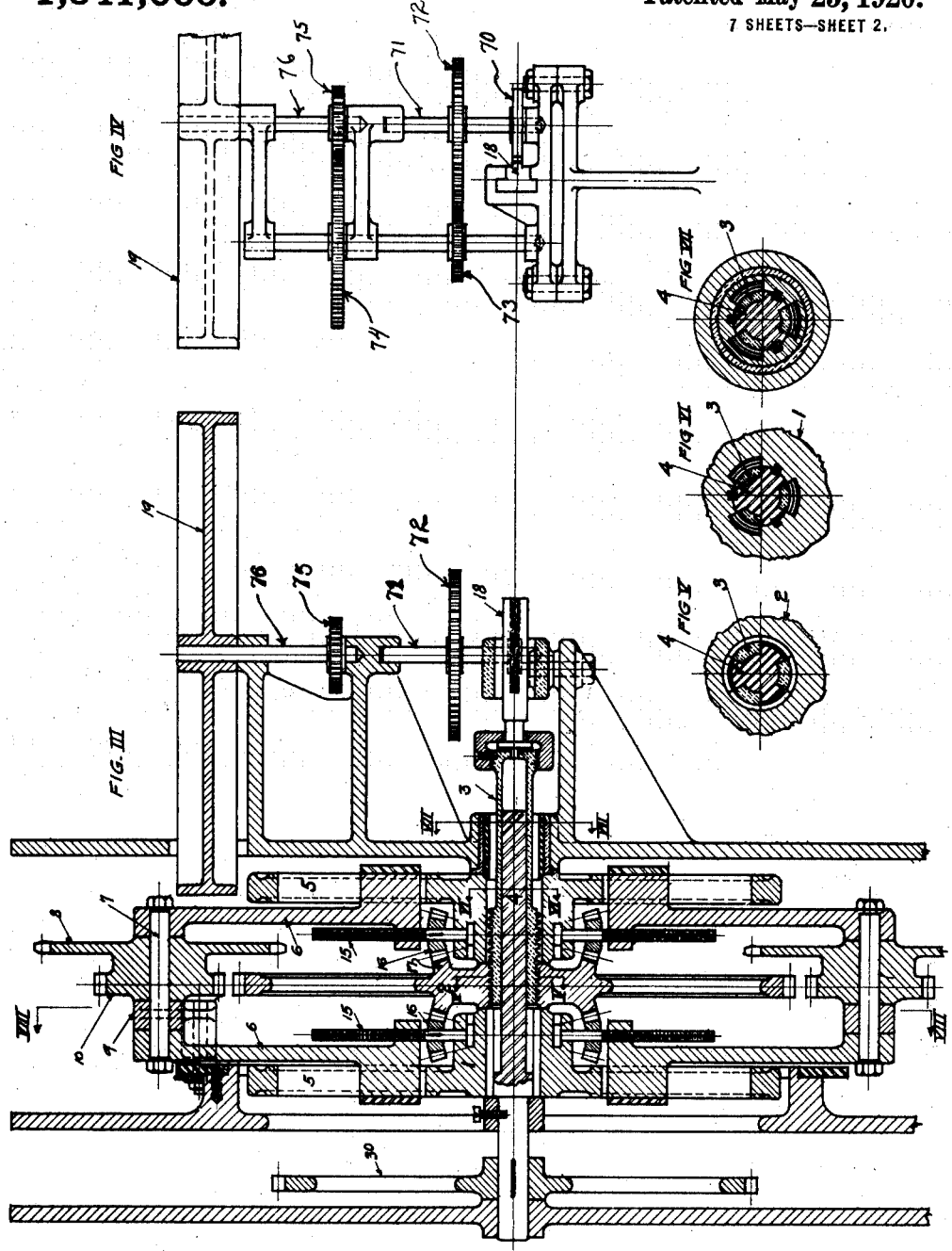

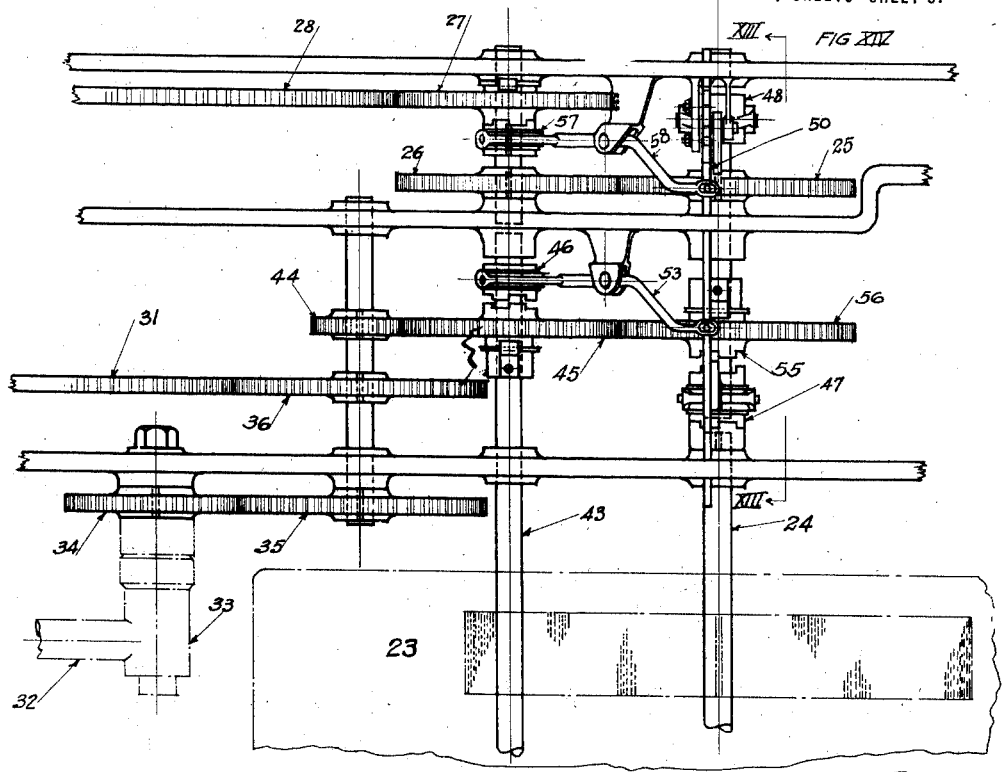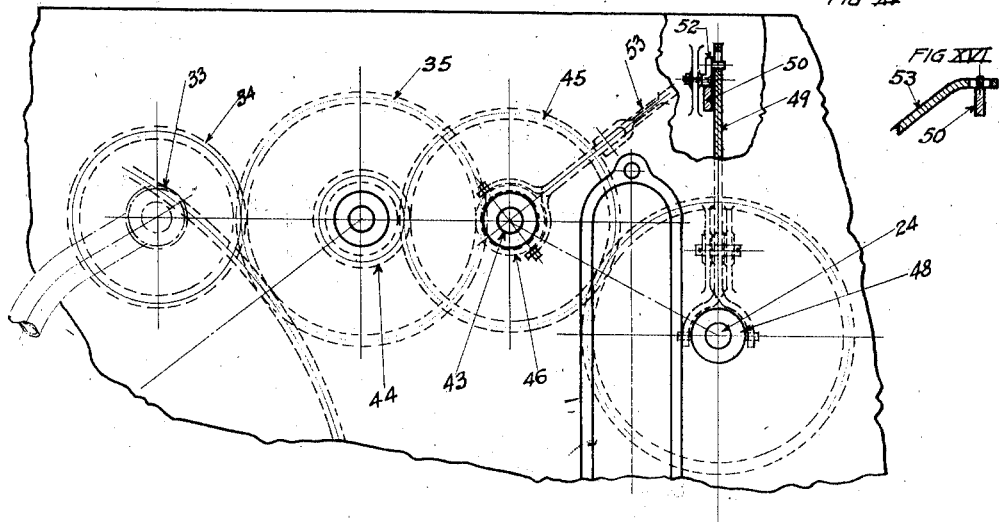

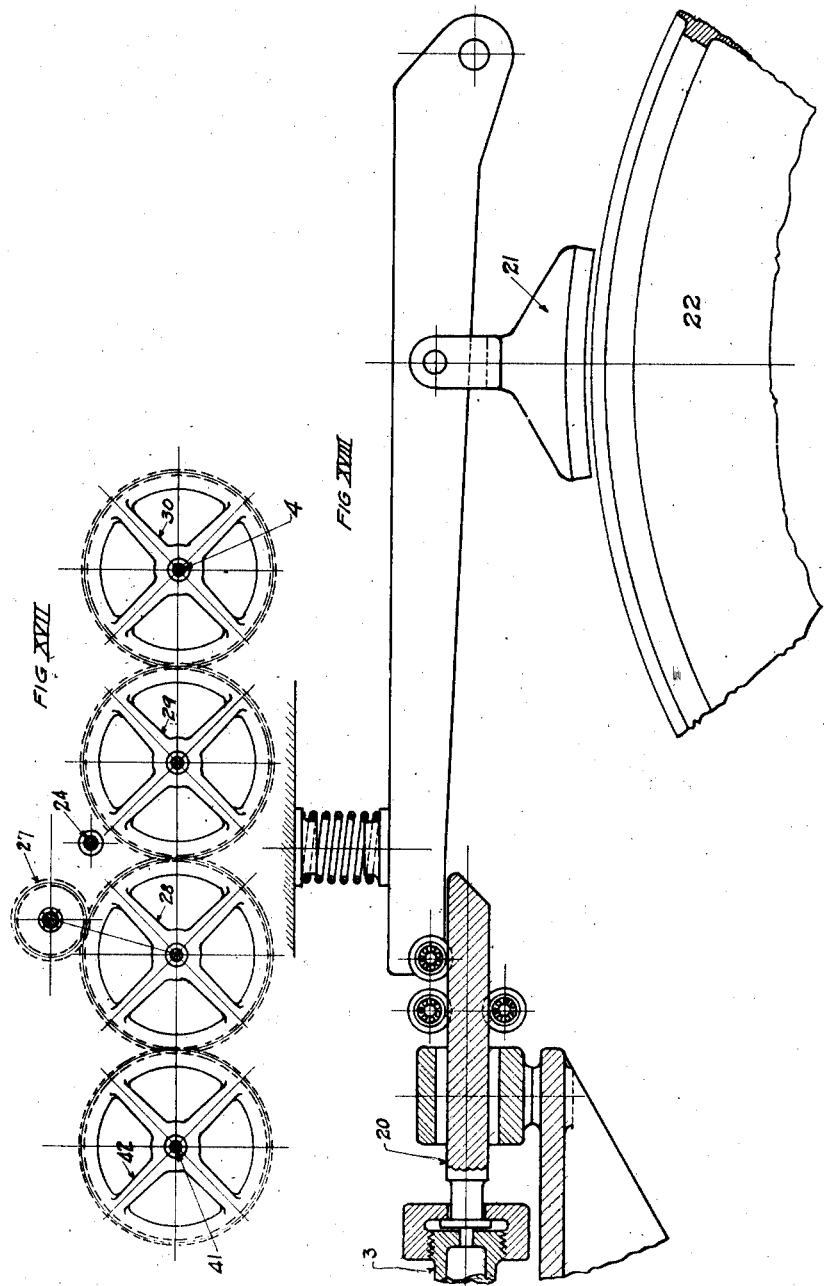

W. H. MORAN.
MACHINE ATTACHMENT.
APPLICATION FILED MAY 28, 1919.
1,341,066.
Patented May 25, 1920.
7 SHEETS—SHEET 7.
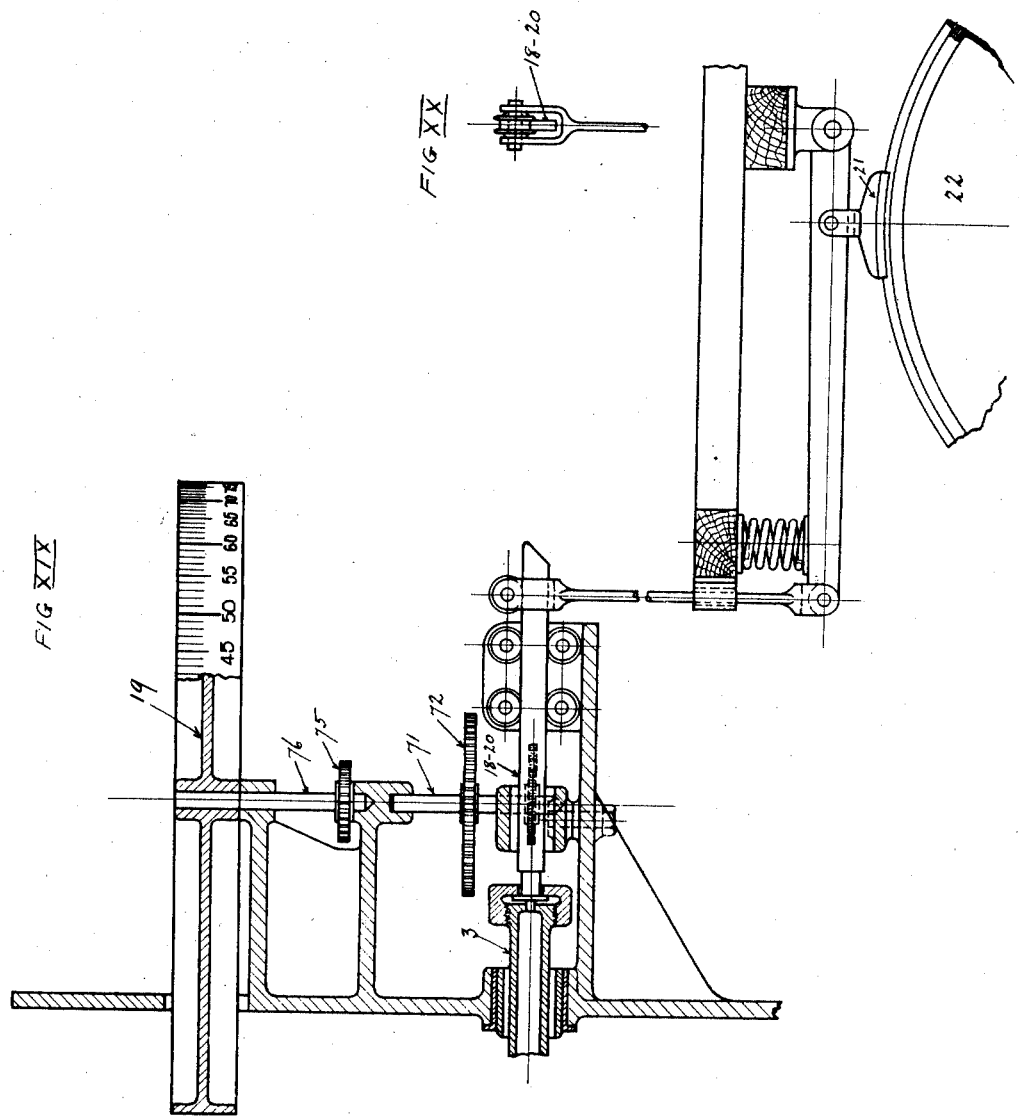
WITNESSES
INVENTOR
William H. Moran
by Christy and Christy
his attorneys

UNITED STATES PATENT OFFICE.

WILLIAM H. MORAN, OF WILKINSBURG, PENNSYLVANIA.

MACHINE ATTACHMENT.

1,341,066.  Specification of Letters Patent.  Patented May 25, 1920.

Application filed May 28, 1919. Serial No. 300,359.

*To all whom it may concern:*

Be it known that I, WILLIAM H. MORAN, residing at Wilkinsburg, in the county of Allegheny and State of Pennsylvania, a citizen of the United States, have invented or discovered certain new and useful Improvements in Machine Attachments, of which improvements the following is a specification.

My invention consists in a machine, auxiliary to another machine, and including a movable member; the movement of that movable member is an expression and index of the speed at which the main machine or a part thereof moves. As the speed of the machine or machine part varies, the movable member of the auxiliary machine is shifted. The auxiliary machine may serve a variety of ends: for example, if applied to a vehicle—a street-car, say—it may, when a predetermined critical point of speed is attained, release an emergency brake, to stop the car or control its speed; or again, coöperating with a suitable recording device, it may serve, when connected to a rotary shaft—an automobile axle,—as a speed indicator. Indeed, though not so limited, my invention finds primary application as the essential and vital part of the instrument called, in automobile parlance, a speedometer. I shall describe it, first, in such application; and, afterward, in illustration of its wider applicability, I shall describe it (in an application already alluded to) as the controlling mechanism of an emergency brake for a vehicle.

In the accompanying drawings which form part of this specification, Figure I is a plan view of a speedometer; in which my invention is embodied; a certain sprocket-chain, presently to be described, has, for illustrative purposes, been removed. Fig. II is a view in vertical section, on the plane indicated by the line II—II, Fig. I. And in Fig. II the sprocket-chain just alluded to, is shown in place.

Fig. III is a view in vertical section, and to larger scale, of the same instrument, on a plane indicated by the line III—III, Fig. I. Fig. IV is a view in side elevation of a portion of the structure as shown in Fig. III. Figs. V, VI, and VII are sectional details, on the planes indicated at V—V, VI—VI, and VII—VII, Fig. III.

Fig. VIII is a view, mainly in vertical section on the plane indicated at VIII—VIII, Fig. III; partly in vertical section on other planes of portions of the structure shown in Fig. III. Fig. IX is a view in section on the plane indicated at IX—IX, Fig. VIII.

Fig. X is a view in vertical section, and to larger scale, on a plane indicated by the line X—X, Fig. I. Fig. XI is a view in section, and also to larger scale, illustrating a detail of the mechanism shown in plan in Fig. I (this figure, however, as will appear on study, is diagrammatic, in that it is not a section on any single plane; it is rather an arbitrary projection into a single plane of parts whose correlation may thus be most clearly shown). Fig. XII is a view in section, and still larger scale, on the plane indicated at XII—XII, Fig. XI. Fig. XIII is a view in vertical section and to larger scale (with a detail shown in another plane), on the plane indicated at XIII—XIII, Fig. XIV. Fig. XIII<sup>a</sup> is a detail view.

Fig. XIV is a view in plan, and to larger scale, of a portion of the mechanism shown in Fig. I. Fig. XV is a view in side elevation, and to larger scale, (with a detail shown in section) corresponding in part to Fig. II. Fig. XVI is a view in vertical section showing a detail.

Fig. XVII is a view in section, on the plane indicated at XVII—XVII, Fig. I.

Fig. XVIII is a view, partly in side elevation, partly in vertical section, showing an emergency brake for a car wheel, controlled in operation by a machine of which my invention is the essence. The coördination of the mechanism of Fig. XVIII will be understood by comparison with Fig. III.

Fig. XIX is a view similar to Fig. XVIII, and shows how the mechanism of my invention may control at once a speed-indicating device and an emergency brake; that is to say, in Fig. XIX certain features shown in Fig. III and certain other features shown in Fig. XVIII are combined. Fig. XX is a view in end elevation of a detail shown in Fig. XIX.

The machine of my invention, in the specific embodiment shown, consists of two rotary members, normally rotating in synchronism, and of a third member, axially arranged with respect to the two rotary members mentioned, and movable longitudinally—that is to say, in axial line,—according as the synchronism of rotation is disturbed. One of the two rotary members is driven at uniform speed by a constantly moving prime motor; the other is subject to impulsion by the machine or machine part with which the machine of my invention is associated—in this case, the wheel of an automobile.

Referring, first, to Fig. III of the drawings, the three essential parts of the machine are to be identified: 1 and 2 are the two rotary members, and 3 is the third, axially reciprocatory member. The member 3 is a sleeve, splined to a shaft 4 (cf. Figs V, VI, VII). It is a skeleton sleeve, to admit of member 1 being keyed to the same shaft 4 in the spaces between the discontinuous portions of the sleeve. This too is clearly shown in Figs. VI and VII. Member 2 is connected by screw-thread engagement with sleeve 3, and member 1 is recessed to admit of the longitudinal traverse of member 3.

Member 1 is a double wheel, consisting of duplicate disks, between whose hubs the hub of member 2 is arranged; and member 2 is a single wheel or disk. In the two disks which constitute the double wheel 1 (both parts of which, it will be understood, are keyed to shaft 4) are formed radial slots 5 (see also Fig. VIII) arranged oppositely in pairs. In each slot is a slide 6 properly secured to admit of radial movement, and at their outer ends the slides are connected, pair by pair, by bolts 7 which constitute axles for sprocket-wheels 8 (cf. Figs. III and VIII). Upon axles 7 are pivoted arms 9 also; there are pinions 10 formed integral with sprocket-wheels 8, and arms 9 carry pinions 11, intergeared with pinions 10. Arms 9 are restrained and tend to swing inward, under tension of springs 12 anchored in the disks of wheel 1; and the arms 9 further are provided with trolley-wheels 13 which run on a stationary cam track 14 conveniently carried in the bed or frame of the machine. When traversing the low part of track 14 (vid. Fig. VIII), the pinions 11, drawn centripetally by springs 12, successively engage the teeth with which the periphery of wheel 2 is provided. Extension screws 15 engage the slides 6, and beveled gearing 16, 17 connects bolts 15 and wheel 2.

Rotation of shaft 4 turns wheel 1; a sprocket-chain, 12, engaging sprocket-wheels 8 (cf. Fig. 2), drives wheel 2. Normally, the two wheels so driven rotate synchronously. In case the rate of rotation of the automobile wheel (or the speed of whatever machine or machine part it be that is under observation) changes, the linear velocity of the sprocket-chain 12, by which wheel 2 is indirectly driven, will change correspondingly (the construction which concerns this particular feature will presently be described), and the speed of rotation of wheel 2 will change. Bearing in mind that shaft 4, with sleeve 3, and wheel 1 turn at a constant (or substantially constant) rate of rotation, variations in speed of wheel 2 mean longitudinal shifting of sleeve 3. Such departure from synchronism in the rotation of wheels 1 and 2 means shifting of sleeve 3, and something more beside: it means radial movement of slides 6 in wheel 1, and consequent enlargement or diminution in the effective circumference of the compound sprocket-wheel made up of the series of sprocket-wheels 8 borne by the slides 6. Such variation of the effective circumference of this compound sprocket-wheel is indicated in Fig. II. Compare the full-line and the dotted-line positions of sprocket-chain 12 there shown. As this compound sprocket-wheel enlarges and diminishes it tends to effect retardation and acceleration in the rotation of wheel 2. It remains only to note that the compound sprocket-wheel enlarges as the speed of sprocket-chain 12 increases, and diminishes as the speed of the chain decreases. The fact thus becomes plain that this expansible and contractible sprocket-wheel is a compensating device: that, as the rate of travel of sprocket-chain 12 changes, the effective circumference of the wheel will change, until wheel 2, disturbed from synchronism, comes again to uniform relation with wheel 1. And always the degree of disturbance will be measured by the degree of displacement of sleeve 3. Sleeve 3 thus becomes an index number, expressing in its movement, and in the extent of its movement, variation, and the quantity of variation, in the speed of the machine or machine part under observation.

The purpose of the cam track 14 is to bring it about, that (with proper overlapping in this sequence) but one of the pinions 11 shall engage wheel 2 at a time—otherwise, the angular divergence of the several wheels in their range of normal movement would be a source of mechanical difficulty. The construction in this respect is clearly indicated in Fig. VIII.

I have said that one application of my invention is as part of a speedometer for automobiles, and in Figs. III and IV this applicability is fully illustrated. The sleeve 3 is prolonged in a rack 18, and through this rack the pinions of an indicating apparatus are driven. The indicating apparatus, as here shown, is of simple type. Rack 18 engages a pinion 70 upon a shaft 71. A succession of speed-magnifying gears 72, 73, 74, 75 imparts to shaft 76 a relatively great range of rotation, as compared with shaft 71. And shaft 76 carries a disk 19 which as will be understood (cf. Fig. XIX) may be graduated along its periphery. Such graduated periphery of disk 19, moving opposite a stationary index (not shown), will afford a reading of the speed to be measured. Of course, in place of a legible speed-indicating device, the well known alternative of a graphic device may in suitable case be substituted.

Turning for a moment to Sheet 6 of the drawings, Fig. XVIII shows the sleeve 3 to carry a latch 20, which latch, on retraction (corresponding, it will be understood, to increase in speed) to a certain point, will release a spring-backed emergency brake 21, and allow it to engage a car wheel 22.

Figs. XIX and XX show the possibility of combining—in case it should be found desirable so to do—speed indicator and emergency brake, and of causing both to be operated by a single mechanism—a single movable member 3. As shown in these figures movement of member 3, of the nature described, imparted to the sliding member marked 18—20 will drive the speed-indicating mechanism, through shaft 71 (after the manner shown in Figs. III and IV and already described), and will also control the operation of emergency brake 21 (as shown in Fig. XVIII and already described).

It will further be plain to every engineer that my invention broadly consists in an apparatus, applicable to a machine or machine part, wherein a reciprocatory member, in its to and fro movement, becomes an expression and an index of variation in the speed of the machine or machine part with which it is associated; and that the reciprocation of this member is available to any desired and proper end. I have now shown and described two such instances of availability: speedometer and emergency brake. But these instances are exemplary merely and are not intended to be exhaustive of the possibilities.

My invention in essential features and characteristics has now been fully and I believe clearly described. It remains to explain apparatus by which constant speed of rotation may be imposed upon wheel 1, while a speed indicative of the varying speed of the machine or machine part under observation or control may be imposed upon wheel 2.

Referring, first, to Fig. 1, 23 is a clock-work, whose driven shaft 24 drives shaft 4, through gears 25, 26, 27, 28, 29, 30 (cf. Figs. XIV, XVII, and III). As for wheel 2, the sprocket-chain which drives it, through instrumentalities already described, is carried by a second and impelling sprocket-wheel. This second sprocket-wheel (best shown in Fig. X) is a compound wheel, made up of a series of small sprocket-wheels 38 mounted peripherally upon a large wheel 31. A flexible shaft 32 (cf. Figs. I and XI) is driven by the machine or machine part (not shown) under observation (or under control), and rotates, as will be understood, under the impulse of that machine or machine part—an automobile wheel, for example. This second sprocket-wheel 31 (cf. Figs. I, II, X, XI and XIV) is driven by the machine or machine part under observation (or under control) through a flexible shaft 32, driven by the machine or machine part (not shown)—an automobile wheel for example, and through the gearing 33 and pinions 34, 35, and 36. As shown on these drawings, no provision is made for recording negative velocities as for instance, in the case of the automobile traveling backward. A pawl and ratchet arrangement 60 overcomes the necessity of this machine recording negative velocity.

When the car is at rest the slides are at the bottom of the slots; when the car is at maximum positive speed forward, the slides are at the top of the slots; when the car moves backward, the slides would tend to move toward the center of the wheel; therefore, I do not attempt to record "reverse" speeds—but use instead the pawl 60.

Inasmuch as the sprocket-wheel first described (the compound wheel, composed of the smaller wheels 8) is expansible and contractible, the sprocket-chain is conveniently kept taut under all conditions of service by the spring-backed "take-up" idler 37 (Fig. II).

While I have now described all that is essential to an operative apparatus, I preferably impose upon wheel 2, not the impulse of the part to be observed (or controlled) only, but the impulse of the clock-work too; so that, whether the automobile (for example) be standing still or running, the two wheels 1 and 2 will rotate in unison, and indication will be given through all ranges of speed.

Explanation of this matter may be amplified: If upon wheel 2 were imposed the impulse of the part whose speed is to be observed and that impulse alone, then, when the automobile (assuming the machine to be used as an automobile speedometer) is at rest, the clock-work, turning wheel 40, would drive the sprocket chain, and the sprocket chain would cause slides 6 to travel to their outermost limit, and there the apparatus would stick. It is by virtue of the fact that the wheel 2 is responsive, not to the part whose speed is to be observed only, but to the impulse of the clock-work as well (both of these impulses being imparted to it through the sprocket chain) that it is delicate to respond, in its rotation relative to wheel 1, to changes in the speed of the automobile. So constructed, and with proper adaptation to the conditions of use, speed indication may be afforded through all the ranges of operation, from zero to the maximum.

To the end just indicated (see Fig. X), sprocket-wheel 31 also is a compound wheel, equipped peripherally with a series of small sprocket-wheels 38 (which, however, are not extensible radially, as are the sprocket-wheels 8). Each sprocket-wheel is provided with an integrally formed pinion 39, and all the pinions 39 mesh (and continually mesh) with a centrally arranged pinion 40 keyed on a shaft 41. Shaft 41 is driven by the clock-work shaft 24, through the pinions 25, 26, 27, 28, and 42 (cf. Figs. I, XIV, XVII, and X). The arrangement is such that the impulse from the clock-work through pinion 40 and the impulse from the automobile axle (or other machine part) through pinion 36 are, in their effect to drive sprocket-chain 12, cumulative. Whether the automobile be stationary or moving, sprocket-wheels 38 will be turning in response to the clock-work; and, if the automobile be moving, wheel 31 will be turning and thus giving additional drive to the sprocket-chain on the periphery of wheels 38. And at all times within the range of contemplated operation, the expansible sprocket-wheel will make compensation for variations in speed of wheel 31, and the two wheels 1 and 2 will rotate in unison—momentary disturbance of such unison being expressed in the movement of sleeve 3, to the ends already described.

Employing a clock-work as I have already described, I find it convenient to wind it by the machine with which my apparatus is associated; and, further, to bring about automatic rewinding, when there is need. Referring to Fig. XIV, 43 is the winding stem of clock-work 23, and winding is effected from flexible shaft 32, already defined, through gearing 33 and pinions 34, 35, 44, and 45. A clutch 46, which is keyed to shaft 43 by a feather key and is open so long as the clock-work is running down and the speedometer working normally, closes (when clock-work 23 has run down) to effect winding of the clock-work. Shaft 24 is a two-part shaft, normally made integral through a clutch 47; and the two clutches 46 and 47 are correlated in movement, so that when one is closed the other is open. The two pinions 45 and 56 are mounted idly upon their respective shafts, and rotated with their shafts only when the clutches 46 and 55 are closed. In the showing of Fig. XIV, both clutches are open. This is the normal position; the clock-work is then driving shafts 4 and 41, and the instrument is in condition to indicate whatever speed may be imposed upon it. The two clutches 46 and 55 close in unison (and simultaneously with the opening of clutches 47 and 57). When they are closed, the rotation of shaft 32 is applied to wind the clock-work; and, at the same time, pinion 56, now secured through clutch 55 to the outer portion of shaft 24, is turning this outer portion of shaft 24 (now dissociated from the inner portion), and this in a direction opposite to normal, to effect ends presently to be described.

The automatic means for shifting these correlated clutches will be understood on comparing Figs. XIII, XIII$^a$, and XIV. A block 48 is screw-threaded on the extension of shaft 24. The extension of the shaft rotates not only when the clock-work is running down, but as has just been shown it rotates also (but in opposite direction) when the clock-work is being wound. The block 48 is carried in a stirrup formed on one arm of a lever 49 pivoted in the frame of the machine; and, being so held against turning, it will range longitudinally to and fro on the extension of shaft 24, as the clock-work is alternately running down and being wound. As the block moves it swings the lever 49 and the lever drives a beam 50 longitudinally, first in one direction and then in the other. The connection between lever 49 and beam 50 is such that lever 49 swings without initially moving the beam but it compresses between itself and the beam one or the other of duplicate springs 51. Finally, lever 49 coming to the end of its swing, trips one or the other of duplicate triggers 52, and the beam 50 is then driven suddenly by spring pressure from one extreme position to the other. Incidentally, the idle trigger 52 is set for the next succeeding movement.

Fig. XIII shows the parts at the moment when block 48 has just reached the limit of its motion to the right, the clock is completely wound up, and the instrument is ready to begin to run down, and, as it runs down, to record speed. This movement of block 48 to the right-hand limit of its range has been effected by the turning of the outer portion of shaft 24 in reverse direction—that is to say, in the direction the reverse of that of normal instrument operation. Note has already been made of the fact that the intermeshing pinions 45 and 56 are normally idle on their several shafts; that they are united to their several shafts, to turn in unison with them, by the simultaneous closing of clutches 46 and 55; and that, simultaneously with the closing of these clutches, clutches 47 and 57 open. When such a shift is made, power imparted through shaft 32 is winding the clock-work, and, through pinion 56, is also turning the outer portion of the shaft 24 in a direction the reverse of normal. This reverse turning of the shaft 24 is not communicated to shafts 4 and 41, because clutch 57 is then open, but it is effective to cause block 48 to move longitudinally of shaft 24 until, reaching the limit of movement, reversal of the clutches is effected, clock-winding ends, and normal instrument operation is resumed. As block 48 moving from left to right has come to the position shown, the trigger 52 on the right has been released and spring 51 on the left previously compressed has exerted its tension to shift beam 50 to the left closing the clutch 47 to make the shaft 24 integral from end to end and at the same time opening clutch 46 and closing clutch 57. The simultaneous opening of clutch 46 and closing of clutch 57 puts an end to the winding-up turning of the outer end of shaft 24 and causes the outer end of shaft 24 to turn in opposite direction and in unison with the inner end of shaft 24—that is to say, the running-down direction. Block 48 begins now to move from right to left as shown in Fig. XIII, and as it does so it will in due course begin to put spring 51 on the right under pressure and will travel until the parts occupy the relative positions shown in Fig. XIII$^a$. In that position the clock-work is just about run down, and is about to be wound again. Further movement of the block 48 to the left will (with attention now to Fig. XIII$^a$) release the trigger 52 on the left, cause the spring 51 on the right to throw the beam 50 the full length of its throw to the right, reverse the positions of the several clutches, and bring the parts to clock-winding position again.

Allusion has been made to clutch 57. When clutch 47 is closed as shown in Figs. XIII and XIV, clutch 46 is open and clutch 57 on the shaft which carries pinions 26 and 27 is also closed. The clock-work then is exerting its turning effect upon shafts 4 and 41. The block of clutch 47 splined to the outer end of shaft 24 is a double clutch member and when shifted to break connection with the inner end of shaft 24, it makes connection with another clutch member 55, which is integral with a pinion 56 meshing with pinion 45. These two pinions 45 and 56 are, when clutches 46 and 55 are closed, secured to the shafts on which they are borne, to cause the shafts to rotate. Clutch 57, connected through an arm 58 to beam 50, opens when clutch 47 opens, to permit the free rotation of the outer end of shaft 24 without driving shafts 4 and 41.

It will thus be seen that all four clutches are operated by the shifting of beam 50, and that there are two alternate positions: in the first position clutches 47 and 57 are closed and clutches 55 and 46 open (this is the position shown in Fig. XIV, the running-down position, the position in which the apparatus is operated to accomplish the end in view); and, second, the reverse, when clutches 47 and 57 are open and clutches 46 and 55 are closed. In this latter position the apparatus is not functioning; shafts 4 and 41 are not influenced by the clock drive, the dial is not then indicating the velocity; and the clock-work is being wound. The block 48 is then traveling from left to right. When thereafter the winding is completed there will be a reversal of the clutches and normal operation will be resumed. As has already been said, Fig. XIII shows the block 48 and its attendant parts in the position which they occupy on the beginning of the running-down position and Fig. XIII$^a$ shows some of these parts near the end of the running-down position.

Fig. XVI (cf. Fig. XIV) indicates the necessary freedom of play in the connection between the arm 53 (and arm 58 which carries clutch 57) and beam 50.

The operation may be briefly reviewed. Suppose the invention to be embodied in a speedometer (as it is shown in all the figures of the drawings but the last) and applied to an automobile; and suppose the automobile to be standing still. The clock-work is then driving shafts 4 and 41; wheel 1 turns with shaft 4 and wheel 2 is being driven by shaft 41 through sprocket-chain 12. The two wheels 1 and 2 are turning synchronously, the sleeve 3 is in a certain position, and the indicator is standing at zero. When the automobile starts, wheel 31 turns, the linear speed of the sprocket-chain 12 is accelerated, and wheel 2 momentarily turns faster; the acceleration of wheel 2 causes the sprocket-wheels 8 to move out radially and uniformly from center of wheel 1 and shaft 4, thus effecting compensation and causing wheel 2 to return to same angular speed as wheel 1. But, meanwhile, sleeve 3 has been shifted, and the indicator shows the speed at which the automobile is traveling. All accelerations and retardations of speed of the automobile thus express themselves in a corresponding limited turning of wheel 2 with respect to wheel 1, either forwardly or backwardly, the extent of such turning being in accord with the amount of such acceleration or retardation, and the result is a corresponding movement in the indicator mechanism and a display on the dial of a proper reading of speed.

Of course the indicator may be a recording device, and not merely an instrument for momentary observation. This is a well understood matter, forming no part of my present invention.

Such is the normal operation. When the clock-work runs down to a predetermined limit the clutches automatically shift, the indicator mechanism goes temporarily out of service, and the turning of the engine of the moving automobile is through whatever moving part be chosen for connection, applied to re-wind the clock-work. This continues until, automatically again, the clutches are shifted back to their initial position; whereupon the instrument resumes its normal speed indicating function. The number of turns of shaft 43 required to wind clock shall be so predetermined as to agree with travel of block 48.

It will suffice to note briefly again that the mechanism in which my invention resides is applicable not to speed-indication merely, but to any desired use, where a motion of a machine part responds in extent to the speed of the part to which the mechanism is applied. I have shown another application—to an emergency brake for a vehicle. The invention is further applicable to any machine or machine part, whether a vehicle or not, whether traveling or stationary—it is applicable to any machine or machine part whose speed of movement is to be observed or recorded or otherwise made available to secondary ends.

It is manifest that in mechanical engineering the instrument may be altered in detail. I have indicated and shall claim the essential features, and my invention will be practised and enjoyed wherever those features are present, even though in other respects the details of my machine be not copied nor employed in detail.

I claim as my invention:

1. An attachment for a machine or machine part, consisting essentially of a prime motor, two members rotary on a common axis, both subject to impulsion by said prime motor, and one adapted to be made additionally subject to impulsion by the machine or machine part to which attachment is made, and a third member coaxial with the two first named and movable axially in response to variations in the relative speed of the two rotary members first named, substantially as described.

2. A speed-indicating device for a machine consisting of a prime motor, two members rotating normally in unison, both subject to impulsion by said prime motor, means for communicating to one of said members an additional rotary impulse from the machine part whose speed is to be indicated, said means including a speed-adjusting device, whereby disturbance of the unity of rotation of the two said members, consequent upon variation in speed of the machine part, will automatically right itself, and means for indicating the degree of such disturbance, substantially as described.

3. An attachment for a machine or machine part, consisting essentially of a prime motor, a shaft, a wheel keyed to said shaft, a second wheel rotatable on said shaft, a series of peripherally arranged radially extensible sprocket-wheels borne by the wheel first named, driving connection between said series of sprocket-wheels and the second wheel mentioned above, means for moving the sprocket-wheels of said series radially in the wheel which bears them, in response to rotation of said second wheel on said shaft, a sprocket-chain engaging said sprocket-wheels, means for driving said sprocket-chain in response to movement of the machine or machine part to which attachment is made, and a member movable in response to and in degree according to the turning of the said second wheel upon said shaft, substantially as described.

4. An attachment for a machine or machine part including in its structure a prime motor, a shaft driven by said motor, a skeleton sleeve splined to said shaft and slidable thereon, a wheel mounted to move integrally with said shaft, a second wheel rotatably mounted on said sleeve and screw-threaded thereon and secured against movement in axial direction relatively to the wheel first named, and means for driving said second wheel in response to movement of the machine or machine part to which attachment is made, substantially as described.

5. An attachment for a machine or machine part including in its structure a prime motor, a shaft driven by said motor, a skeleton sleeve splined to said shaft and slidable thereon, a wheel mounted to move integrally with said shaft, a second wheel rotatably mounted on said sleeve and screw-threaded thereon and secured against movement in axial direction relatively to the wheel first named, means for driving said second wheel in response to movement of the machine or machine part to which attachment is made, said means last mentioned including a speed-adjusting device whereby, as said second wheels turns on said sleeve, the said driving means become ineffective to accomplish further turning, substantially as described.

6. An attachment for a machine or machine part including in its structure a prime motor, a shaft driven by said motor, a skeleton sleeve splined to said shaft and slidable thereon, a wheel keyed to said shaft, a series of radial slots in said wheel, a series of slides in said slots, a sprocket-wheel borne by each of said slides, extension bolts engaging said wheel and each one of said slides, a second wheel rotatably mounted on said sleeve and screw-threaded thereon, driving connection maintained under all conditions of extension between said series of sprocket-wheels and said second wheel, inter-gearing connecting said second wheel and said extension bolts and means for imparting to said sprocket-wheels the impulse of the machine or machine part to which attachment is made, substantially as described.

7. An attachment for a machine or machine part including in its structure a prime motor, a driven member, means for imparting to said driven member the impulse of the prime motor, means for imparting to said driven member the further impulse of the machine or machine part to which attachment is made, two rotary members, means for imparting to said rotary members severally the impulse of the prime motor and of the driven member, and a member movable in response to and in accordance with variations in the relative speed of the said two rotary members, substantially as described.

8. An attachment for a machine or machine part including in its structure a prime motor, a driven member consisting of a shaft driven by said prime motor, two wheels, one of which is keyed to said shaft and the other rotatable thereon, the second being provided further with a series of peripheral sprocket-wheels, means for imparting to said sprocket-wheels rotation from said wheel first identified as keyed to the shaft, means for imparting to the second of the wheels indicated above the impulse of the machine or machine part to which attachment is made, two rotary members, operative connection from the prime motor to one of said members, operative connection from the driven member to the other of said members, and a member movable in response to and in accordance with variations in the relative speed of the said two rotary members, substantially as described.

9. In an attachment for a machine or machine part the combination of two compound sprocket-wheels, each consisting of a series of simple sprocket-wheels borne on the periphery of a carrier wheel, and a sprocket-chain encircling both, the wheels of one series being radially extensible upon the carrier wheel, a prime motor, driving connections from said prime motor to the carrier wheel of said extensible compound sprocket-wheel, driving connection from the machine or machine part to which attachment is made to the carrier wheel of the other compound sprocket-wheel, means for imparting rotation from the prime motor to the sprocket-wheels individually of the compound sprocket-wheel last named, a third rotary wheel, driving connections from the individual sprocket-wheels of the extensible compound wheel to said third wheel, means for extending and retracting the sprocket-wheels of the extensible compound wheel, such means operable in response to variations in rate of rotation between the extensible compound wheel and the third wheel mentioned above, and a member movable in response to and in accordance with such variations, substantially as described.

10. In an attachment for a machine or machine part a clock-work having a winding-stem, two rotary members, means for imparting to one of said rotary members the impulse of said clock-work, means for imparting to the other of said members the impulse of the machine or machine part to which attachment is made, a third member movable in response to and in accordance with variations in relative movement of the two said rotary members, and automatically operative means for interrupting the means of imparting impulse above defined and for applying the impulse of the machine or machine part to which attachment is made to the winding-stem of said clock-work, substantially as described.

11. In an attachment for a machine or machine part a clock-work having a winding-stem, two rotary members, means for imparting to one of said rotary members the impulse of said clock-work, means for imparting to the other of said members the impulse of the machine or machine part to which attachment is made, a third member, movable in response to and in accordance with variations in relative movement of the two said rotary members and means automatically operative as the clockwork runs down for interrupting the impulse-imparting means already defined, and for applying the impulse of the machine to the winding of the clockwork, substantially as described.

In testimony whereof I have hereunto set my hand.

WILLIAM H. MORAN.

Witness:
FRANCIS J. TOMASSON.